(12) United States Patent
McCoid

(10) Patent No.: US 7,100,287 B2
(45) Date of Patent: Sep. 5, 2006

(54) TRIMMER LAWN MOWING DEVICE

(76) Inventor: Trevor Albert McCoid, 3A Limmer Place, Browns Bay, Auckland (NZ)

( * ) Notice: Subject to any disclaimer, the term of this patent is extended or adjusted under 35 U.S.C. 154(b) by 0 days.

(21) Appl. No.: 10/683,129

(22) Filed: Oct. 14, 2003

(65) Prior Publication Data

US 2005/0076514 A1    Apr. 14, 2005

(30) Foreign Application Priority Data

Jun. 10, 2003  (NZ) ............................ 526424
Jul. 25, 2003  (NZ) ............................ 527227

(51) Int. Cl.
   *A01D 34/416*  (2006.01)
   *B26B 7/00*    (2006.01)
   *A01G 3/06*    (2006.01)

(52) U.S. Cl. ........................... 30/276; 30/347
(58) Field of Classification Search .............. 30/276, 30/347; 56/12.7, 12.8, 320.1
   See application file for complete search history.

(56) References Cited

U.S. PATENT DOCUMENTS

| | | | |
|---|---|---|---|
| 3,170,276 A | 2/1965 | Hall | 56/25 |
| 4,124,938 A * | 11/1978 | Ballas, Sr. | 30/276 |
| 4,200,978 A | 5/1980 | Irelan et al. | 30/276 |
| 4,245,456 A * | 1/1981 | Zipfel | 56/12.8 |
| 4,361,001 A * | 11/1982 | Almond et al. | 56/12.8 |
| 4,428,183 A | 1/1984 | Lowry et al. | 56/17 |
| 4,501,332 A | 2/1985 | Straayer | 172/41 |
| 4,802,327 A | 2/1989 | Roberts | 56/15 |
| 4,848,846 A * | 7/1989 | Yamada et al. | 30/276 |
| 4,922,694 A | 5/1990 | Emoto | 56/16 |
| 5,020,281 A * | 6/1991 | Neff | 451/358 |
| 5,023,998 A * | 6/1991 | Masciarella et al. | 30/276 |
| 5,048,187 A | 9/1991 | Ryan | 30/276 |
| 5,060,383 A | 10/1991 | Ratkiewich | 30/276 |
| D350,463 S | 9/1994 | Hardesty, Jr. | 8/8 |
| 5,491,963 A | 2/1996 | Jerez | 56/17 |
| 5,651,418 A | 7/1997 | Jerez | 172/14 |
| 5,836,142 A | 11/1998 | Maxwell | 56/12 |
| 5,862,595 A * | 1/1999 | Keane | 30/124 |
| 5,878,556 A * | 3/1999 | Franz | 56/12.7 |
| 6,014,812 A | 1/2000 | Webster | 30/276 |
| 6,032,442 A | 3/2000 | Paolo | 56/12 |
| 6,260,278 B1 * | 7/2001 | Faher | 30/276 |
| 6,266,950 B1 * | 7/2001 | Stace | 56/12.8 |
| 6,293,350 B1 | 9/2001 | Paolo | 172/15 |
| 6,324,764 B1 | 12/2001 | Watkins | 30/270 |
| 6,423,126 B1 | 7/2002 | Akiyama | 106/14 |

(Continued)

FOREIGN PATENT DOCUMENTS

GB    2118811 A    11/1983

(Continued)

*Primary Examiner*—Hwai-Siu Payer
(74) *Attorney, Agent, or Firm*—Jacobson Holman PLLC

(57) ABSTRACT

A lawn trimming device attachable or attached to the power take off end of a line trimmer primary unit to be powered by the line trimmer. The device includes a hood with a downwardly facing opening to allow the opening to be placed parallel to the ground, the hood defining a cutting cavity. A coupling of the hood to the line trimmer primary unit is provided and a shaft is included. A cutting element rotatably mounted relative to the hood from the shaft is provided and wherein the shaft is engageable to the line trimmer primary unit to derive rotational power from the line trimmer primary unit. The cutting element is positioned within the cutting cavity of the hood adjacent the opening. A hovering fan is also preferably included within the hood.

22 Claims, 13 Drawing Sheets

U.S. PATENT DOCUMENTS

| | | |
|---|---|---|
| 6,430,906 B1 | 8/2002 | Eddy .......................... 56/13 |
| 2002/0083693 A1 | 7/2002 | Smith ......................... 56/12 |
| 2003/0066279 A1 | 4/2003 | Deal .......................... 56/17 |

FOREIGN PATENT DOCUMENTS

| | | |
|---|---|---|
| JP | 10033039 A | 2/1998 |
| NZ | 196800 | 4/1982 |
| NZ | 196795 | 12/1983 |
| NZ | 225180 | 11/1989 |
| NZ | 314123 | 12/1997 |
| NZ | D401794 | 12/1998 |

\* cited by examiner

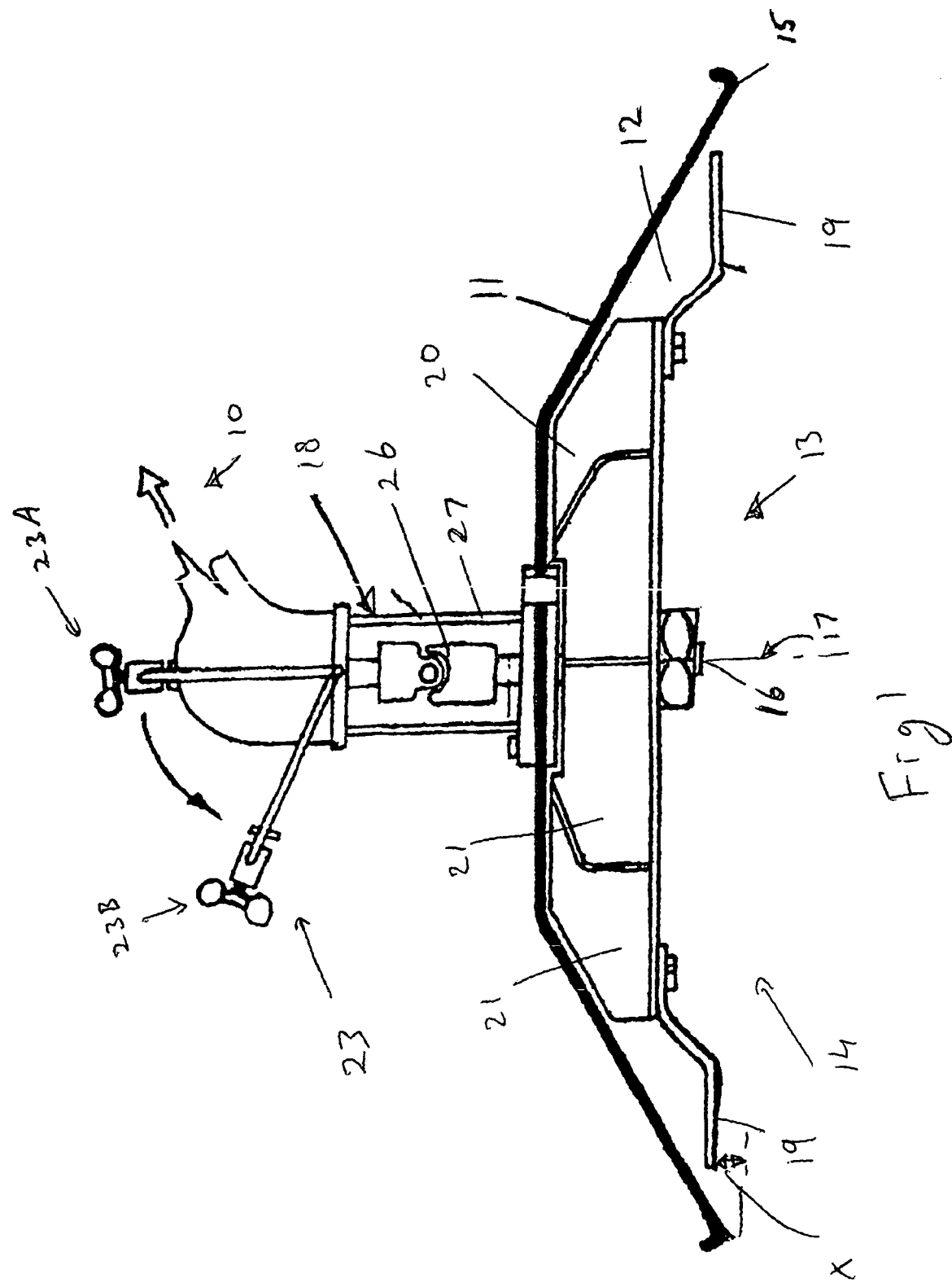

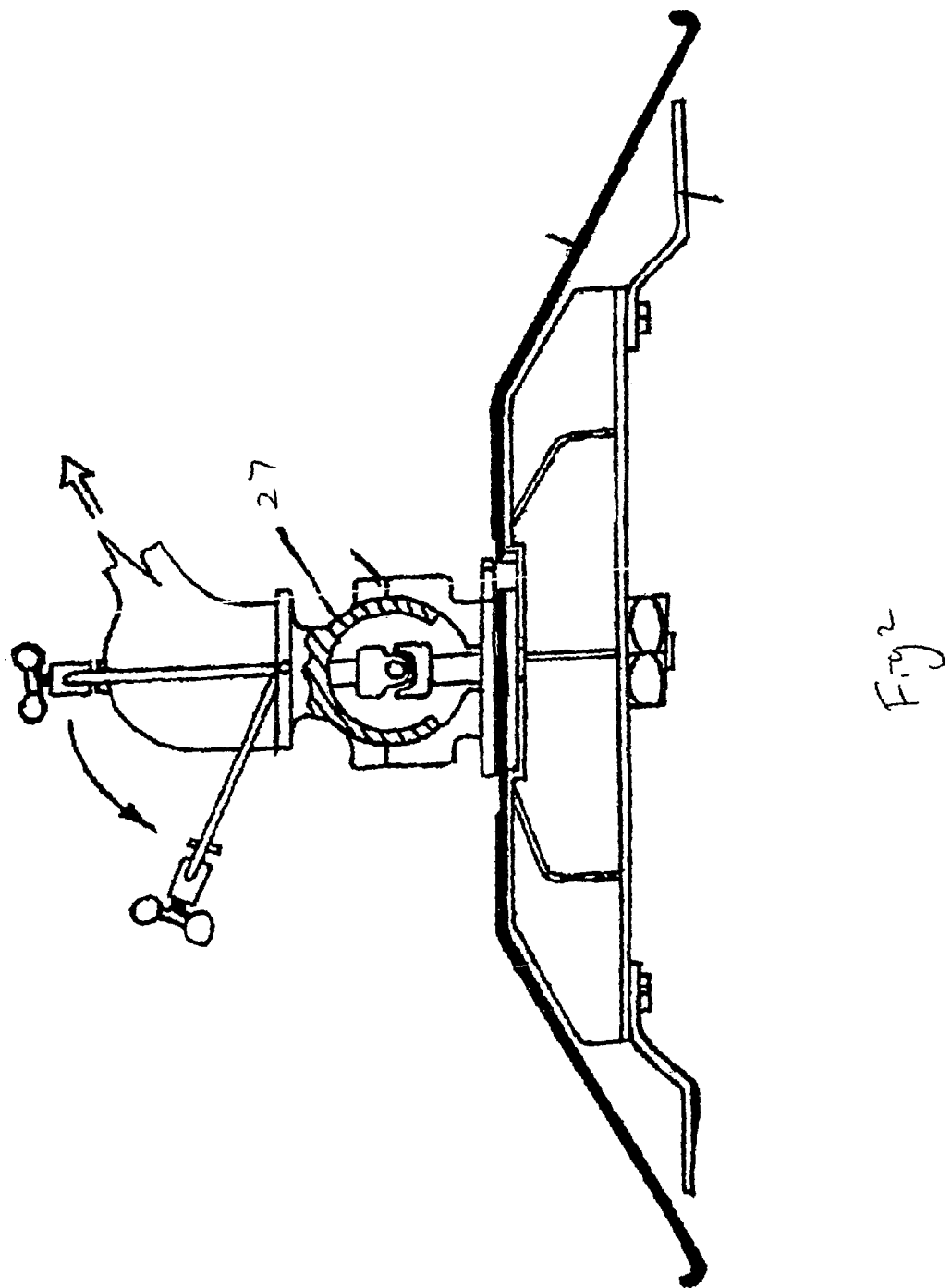

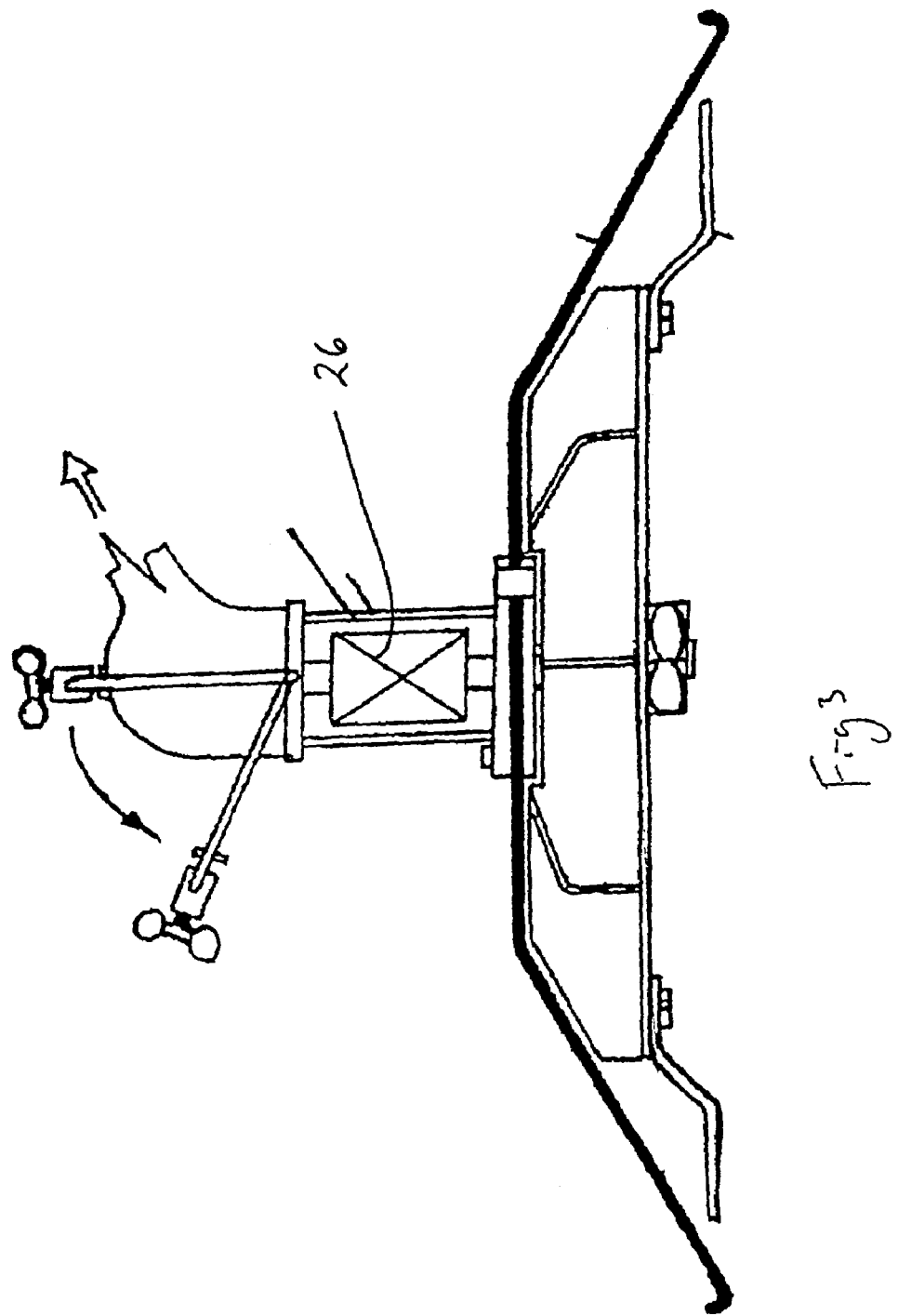

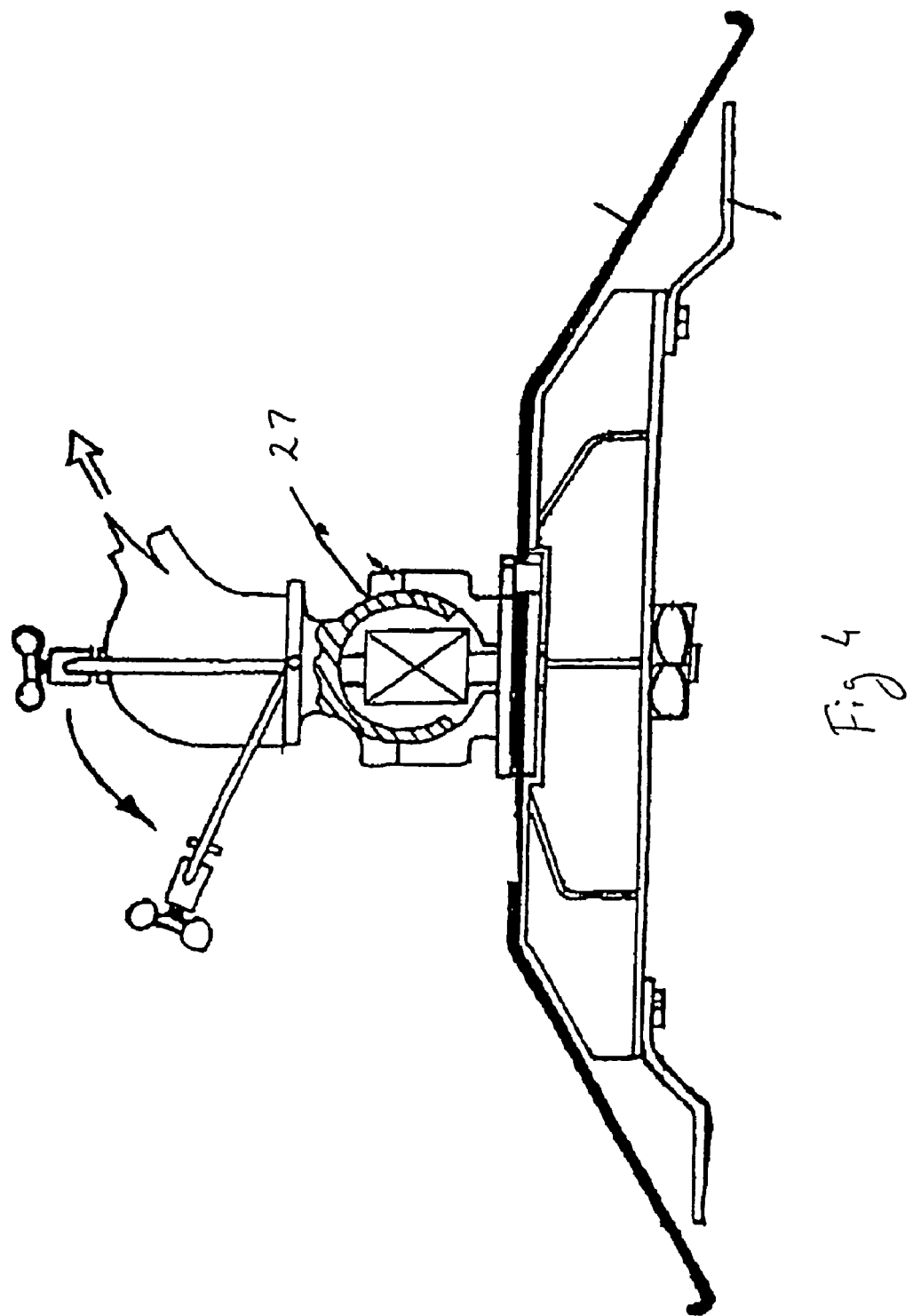

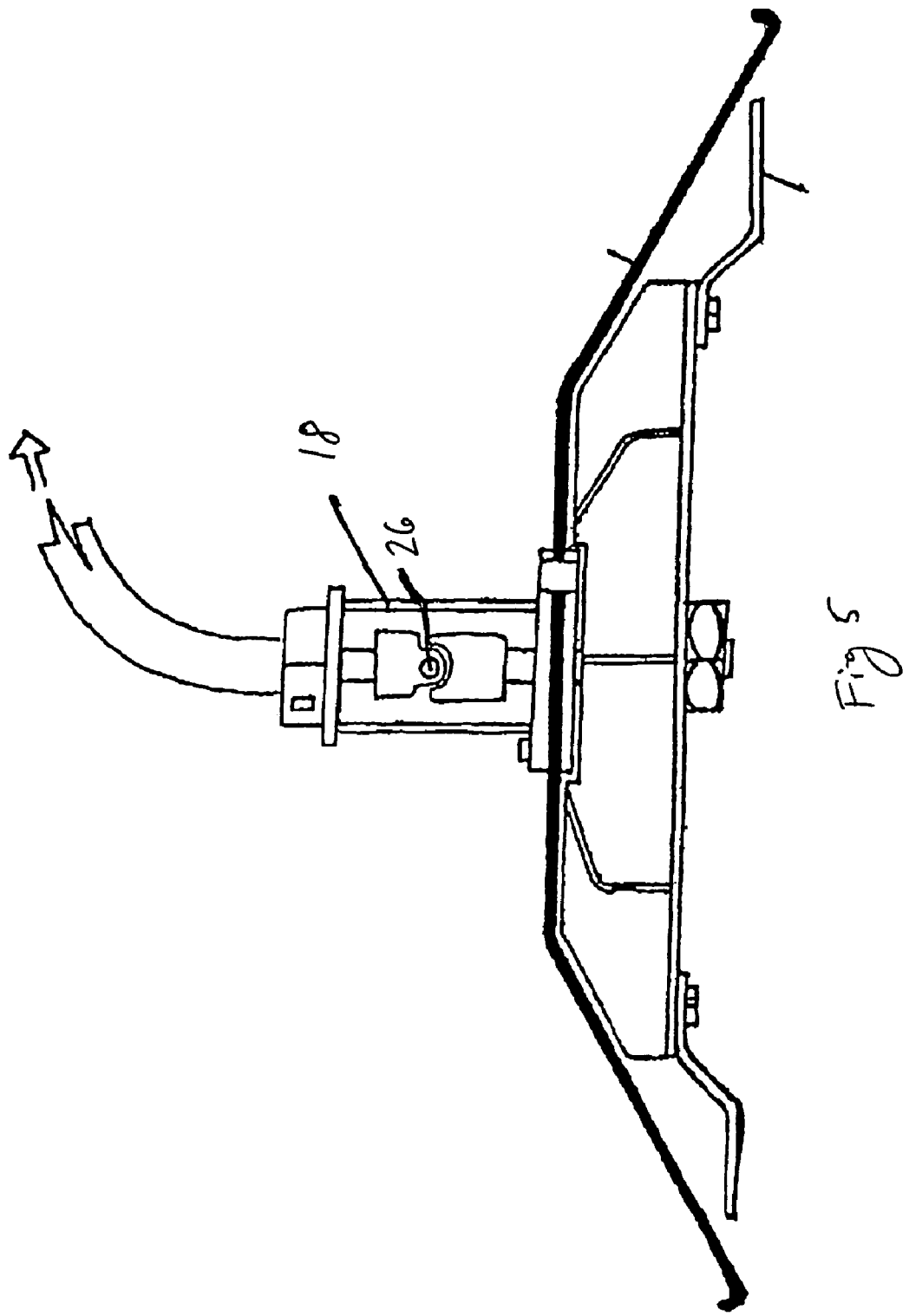

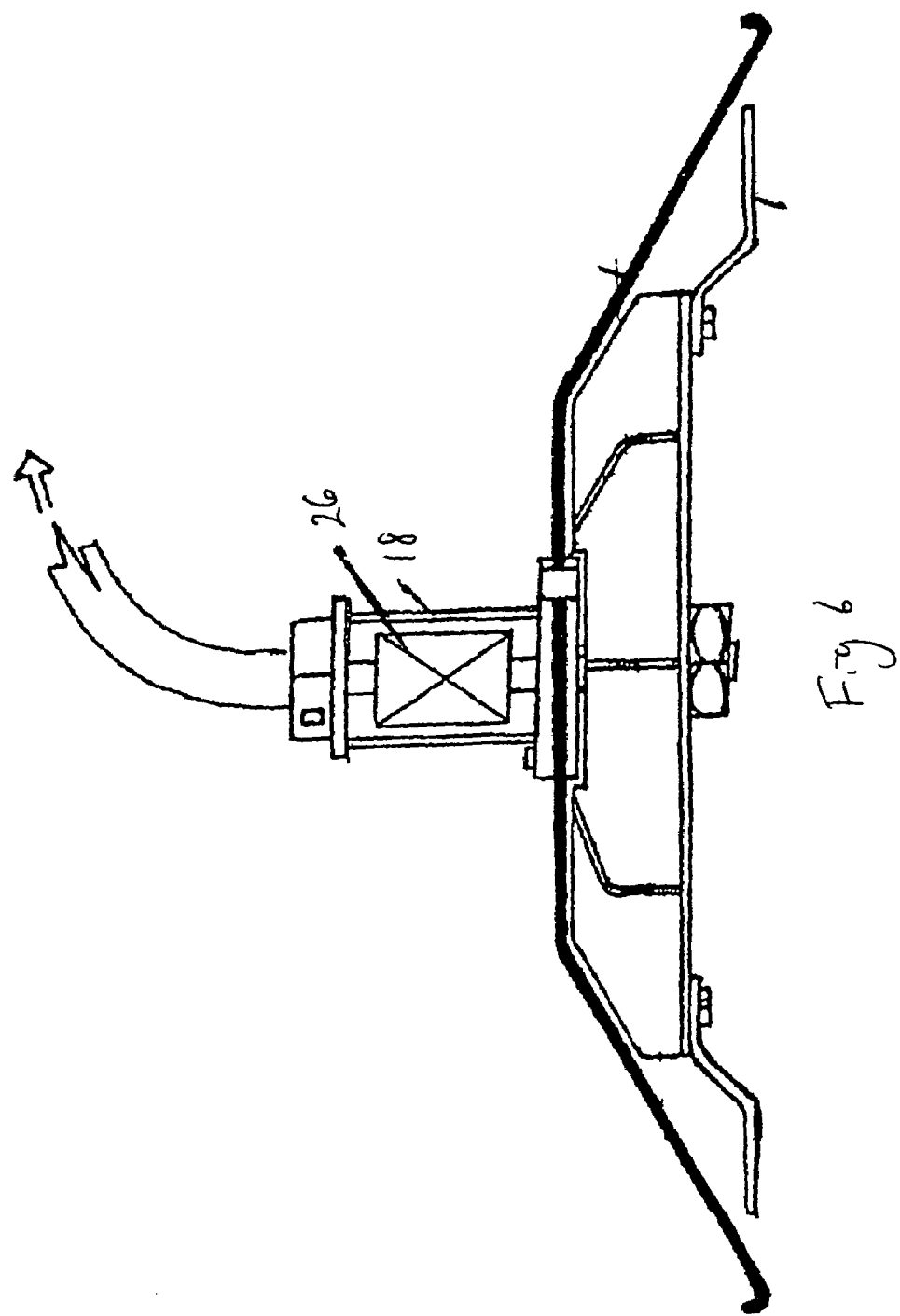

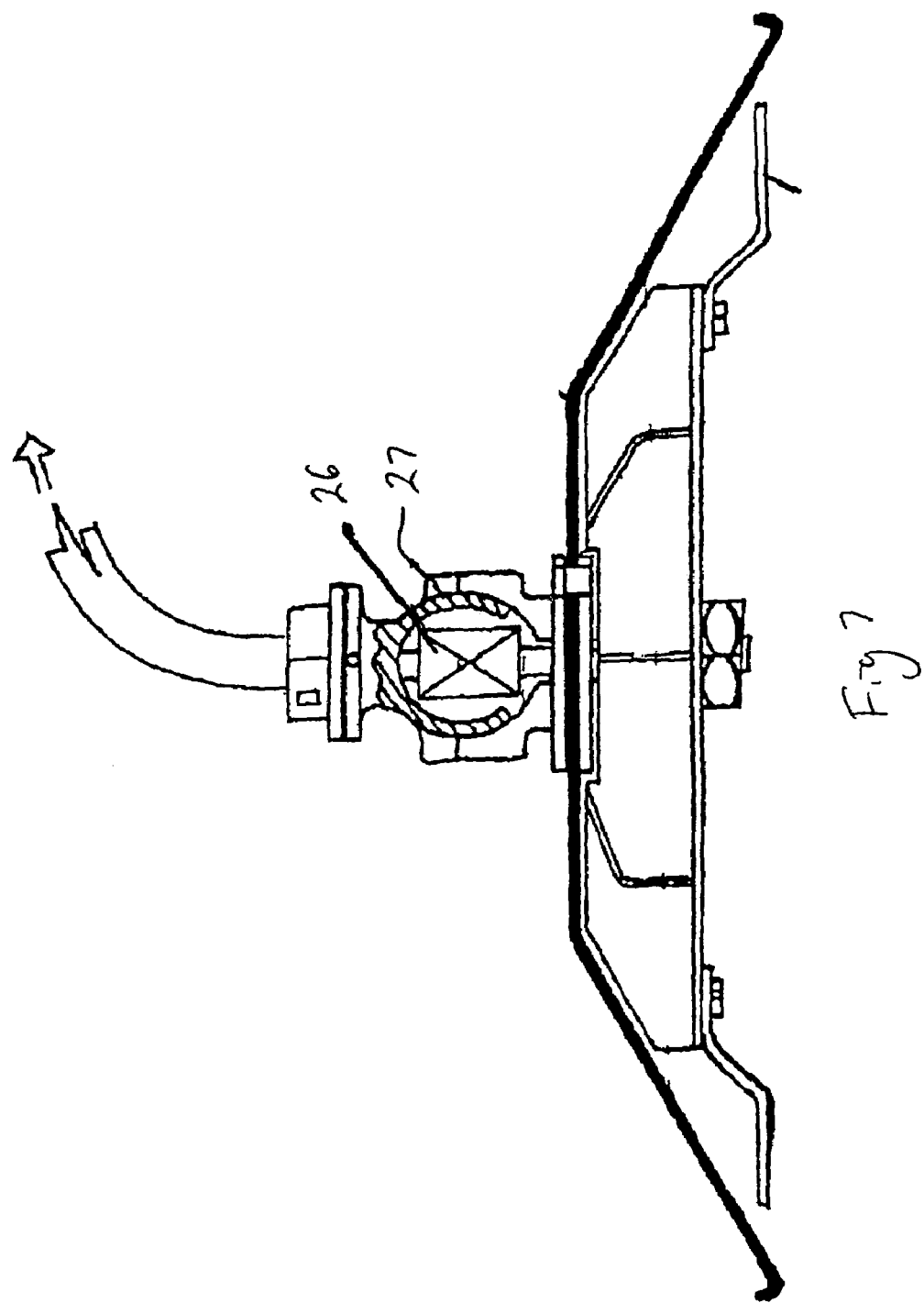

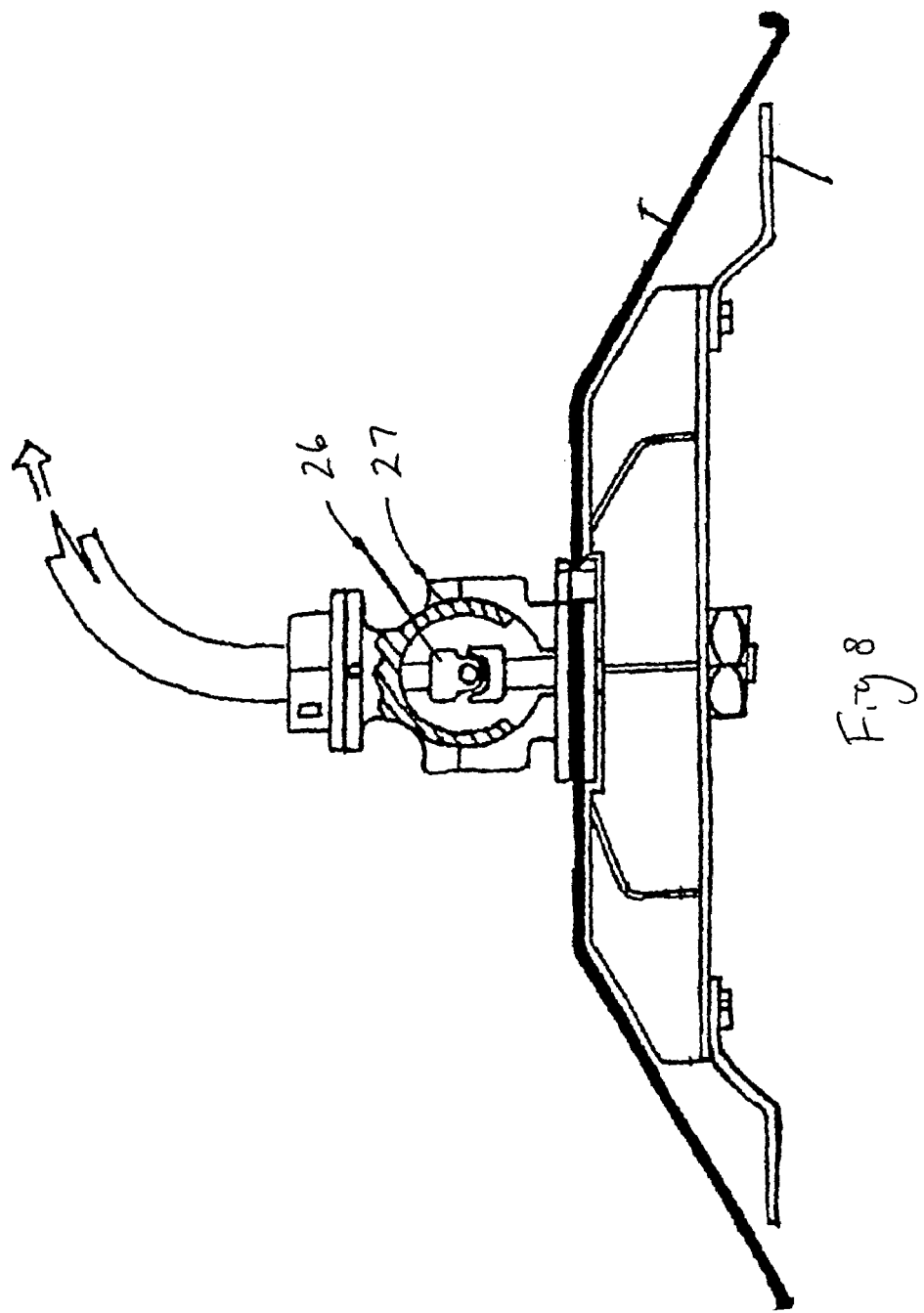

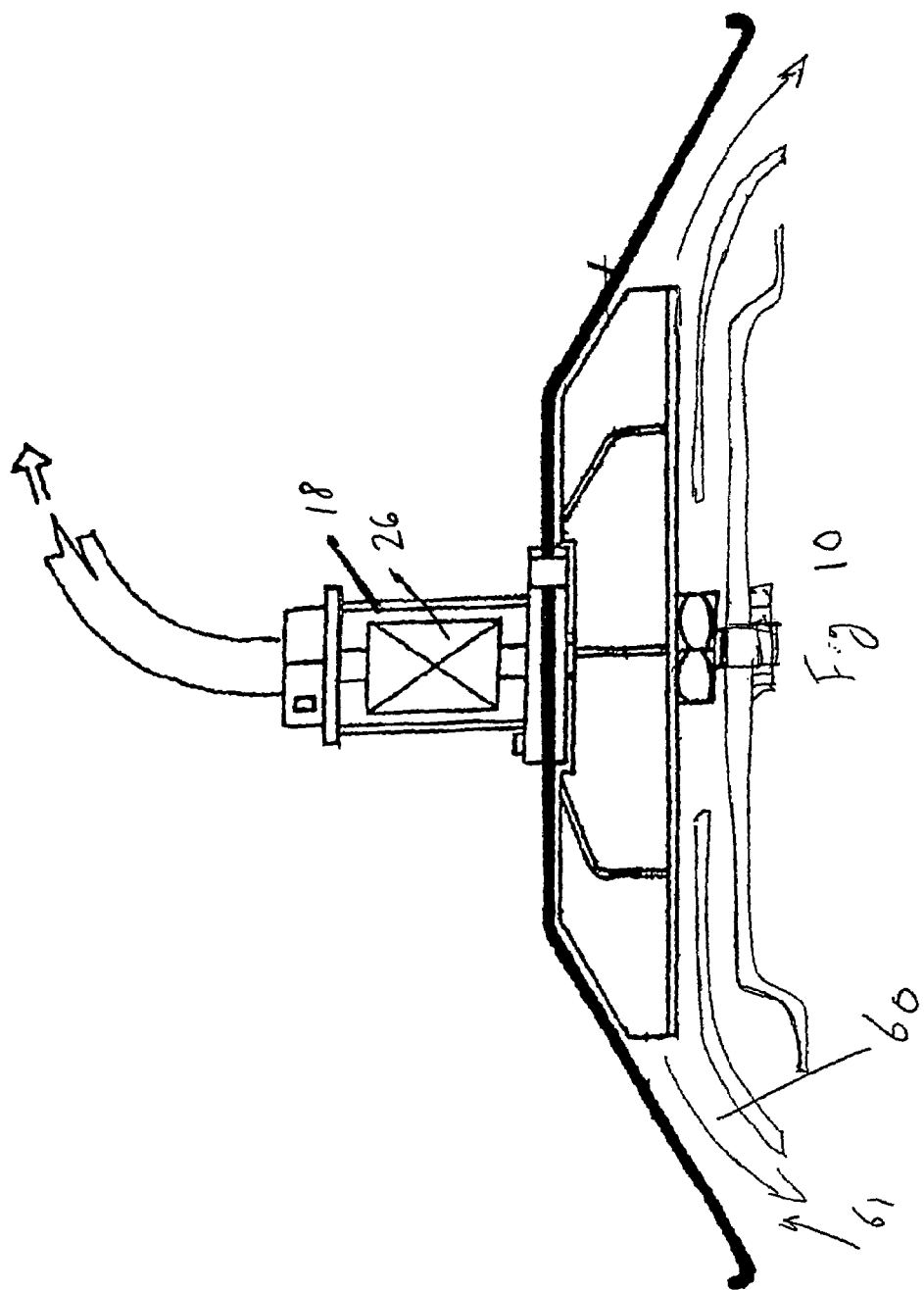

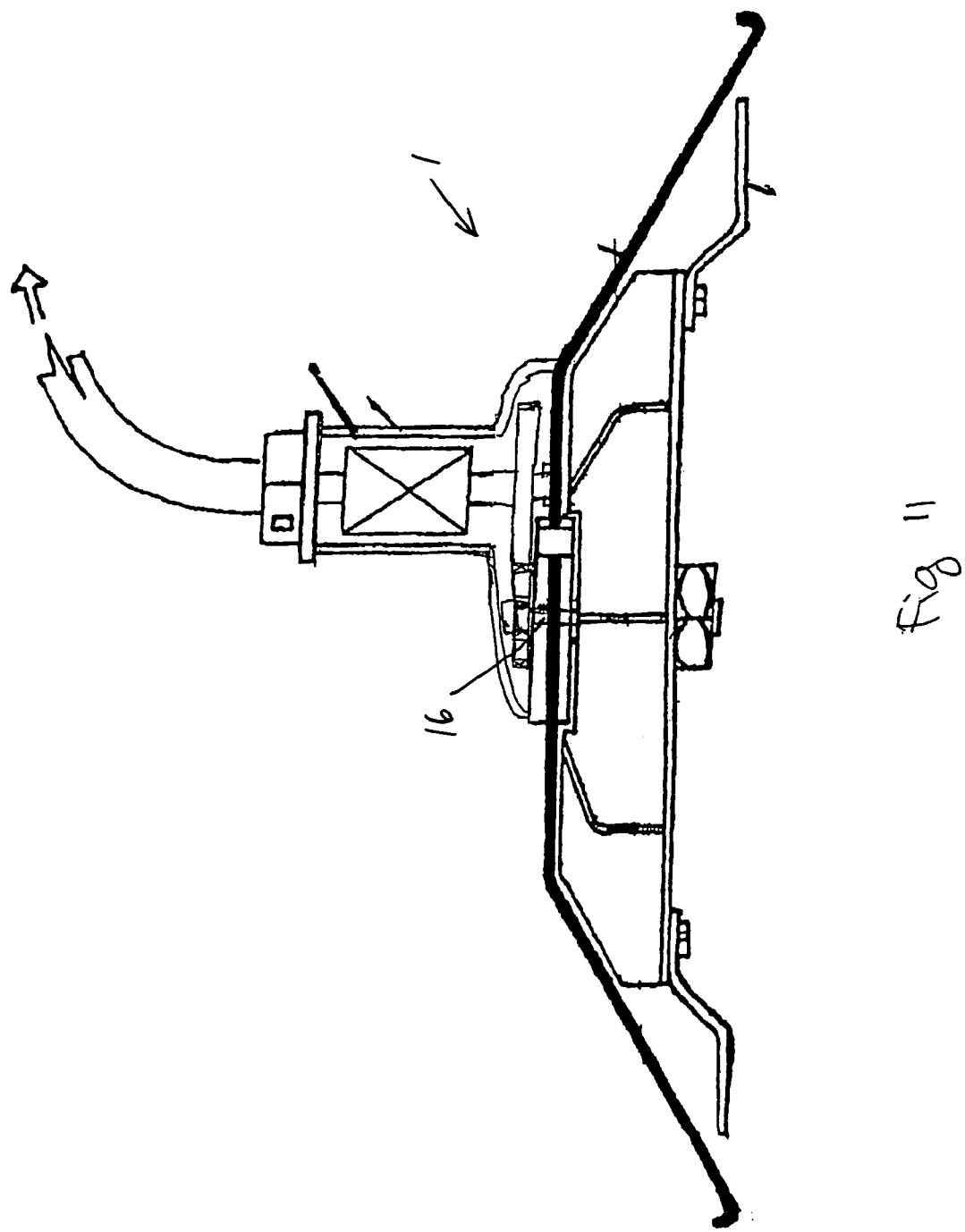

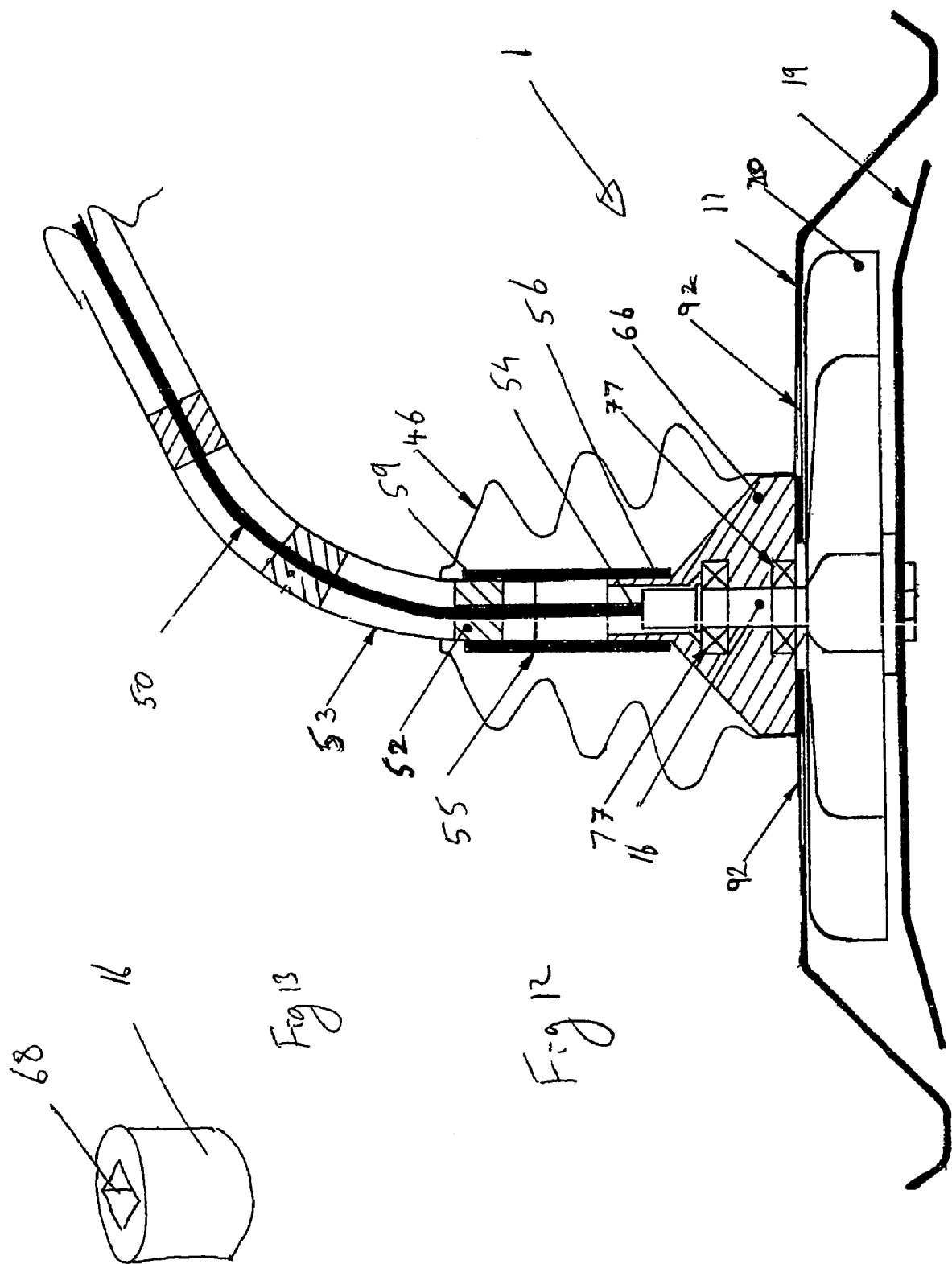

TRIMMER LAWN MOWING DEVICE

FIELD OF INVENTION

The present invention relates to a line trimmer lawn mowing device.

BACKGROUND

Line trimmers of the kind which are often used for trimming the edges of lawn or for trimming weed or indeed for trimming grass such as is often found on the sides of roads or highways include a motor (usually an internal combustion motor) which is engaged to the end of a shaft. The motor will drive a shaft which at the other end has attached the cutting element. A cutting element may for example be a fixed blade or alternatively be a nylon string which is rotationally driven via the shaft by the motor. The cutting elements can be exposed to the grass or weed to cut the grass or weed at the desired height. The unit will normally include a handle and rpm controller to control the rpm's of the motor. For heavier units the line trimmer may also include a support harness which can be slung about the body of a user to provide support by the user to the weight of the unit. Whilst some versions of a line trimmer will provide a guard presenting protection to the cutting elements in a direction of the body of the user, such a guard merely serves the purpose of providing protection, and then only in on direction or arc of directions.

A standard line trimmer however has difficulty in being used for cutting lawn to a desired level. Since the cutting elements can be held at a varying height above the ground careful control is needed to be exercised by the user to achieve a cut of grass at a consistent height across the entire area of the lawn. This can be difficult to achieve and if the line trimmer is held at the wrong angle, can result in gauging of the lawn thereby creating an uneven look to the height of the cut grass. It is appreciated that lawn mowers can achieve a consistent height in the cutting of grass thereby. However lawn mowers are relatively large tools and its certain applications particularly in residential or inner city locations where the amount of grass that is to be cut is relatively minimal, it may not be desirable or practical to use a lawn mower for cutting the grass.

Accordingly it is an object of the present invention to provide a line trimmer lawn trimmer attachment unit which addresses the abovementioned disadvantages or which will at least provide the public with a useful choice.

BRIEF DESCRIPTION OF THE INVENTION

Accordingly in a first aspect the present invention consists in a lawn trimmer component for attachment to a hand held prime mover of a kind which includes a motor (electric or internal combustion) with which an elongate drive shaft is connected to be rotationally driven by said motor said elongate drive shaft captured substantially within a protective sleeve rigidly connected to said motor, said elongate drive shaft presented at an end of said protective sleeve away from said motor for coupling to said lawn trimmer component, said lawn trimmer component comprising:

(a) a rotary shaft to derive rotational power via said elongate drive shaft from said motor for rotating said rotary shaft about an axis of rotation
(b) a cutting means engaged to and radially disposed from said rotary shaft to rotate about said axis of rotation
(c) a hood defining a cutting chamber extensive over said cutting means yet exposing said cutting means to an opening of said hood which, in use, is to be positioned juxtaposed the ground over which said lawn trimmer component is, by control of said prime mover, moved by a user, wherein said hood is mounted stationary to said rotary shaft save for the relative rotation of said rotary shaft with said hood about said axis of rotation,
(d) a flexible coupling device engaged to said hood and engagable with said end of said protective sleeve, said flexible coupling device to mount said hood from said protective sleeve in a manner to allow the hood to swivel relative to said protective sleeve.

Preferably said opening of said hood is a planar opening.

Preferably said cutting means extends from said rotary shaft to present a cutting edge thereof substantially parallel to the plane of said opening.

Preferably said opening of said hood is at least coextensive with the cutting profile generated by said cutting means when rotated about said axis of rotation.

Preferably said opening of said hood is at least coextensive with the circular perimeter traced by said cutting edge when rotated about said axis of rotation.

Preferably said rotary shaft is engaged to and to be supported from said hood by a cylindrical bearing.

Preferably said rotary shaft includes a cutting means mount with which said cutting means is affixed and a stub axle extending therefrom coaxial with said axis of rotation, said stub axle supporting said hood in a fixed relationship thereto save for relative rotation about said axis of rotation.

Preferably said flexible coupling device has said rotary shaft located therethrough, said rotary shaft is a flexible rotary shaft presenting an input end to engage with said elongate drive shaft and an output end to engage with said cuttings means, said input end capable of axial misalignment with said axis of rotation of said cutting means to allow said hood to swivel relative to said input end yet still allow in use a continuous power to be provided by said motor via said elongate drive shaft.

Preferably said flexible coupling includes a flexible interconnection structure fixed at one end relative to said hood and to be fixed at the other end to said sleeve of said prime mover and relative to which said drive chain is in use to rotate.

Preferably said flexible coupling device is hollow and said rotary shaft is captured therein.

Preferably said flexible rotary shaft consists of at least two parts joined by a universal joint.

Preferably said flexible rotary shaft consists of at least two parts joined by a kinematic coupling.

Preferably said flexible rotary shaft consists of at least two parts joined by a CV joint.

Preferably said flexible rotary shaft consists of at least two parts joined by a mechanical linkage joint.

Preferably said flexible coupling device is a ball and socket connection.

Preferably said flexible coupling device is a bendable sleeve through which said rotary shaft extends.

Preferably said coupling device is a coupling region of and at an axially distal end of said rotary shaft to said cutting means and with which said shaft of said prime mover is able to directly engage.

Preferably a fan is mounted from said rotary shaft for rotation relative to said hood and about said axis of rotation and within the perimeter of said hood in a manner to generate an airflow which in use is in a direction outward from the opening of said hood.

Preferably said cutting means is provided intermediate of said opening and said fan.

Preferably said fan is a centrifugal fan and the airflow generated by its rotation is displaced in a generally radial direction and in consequence of said hood being substantially enclosing to airflow generated travelling away from said opening, said air flow is expelled from said hood in a direction outward from said cutting chamber via said opening.

Preferably said fan is an axial fan and the airflow generated by its rotation is displaced in a generally axial direction to be expelled from said hood in a direction outward via said opening Preferably said fan includes a plurality of fan blades.

Preferably said fan is mounted from said rotary shaft.

Preferably said hood includes upper enclosure defining surface(s) which in general slope in a direction towards said opening to provide entrainment surface(s) to said airflow generated by said fan in create a flow direction generally towards said opening.

Preferably wherein rotational speed changing means are provided intermediate of said rotary shaft and said coupling device.

Preferably said rotational speed changing means is a speed changing gear.

Preferably said hood includes a cavity within which a fan is mounted dependent from said rotary shaft for rotation about said axis of rotation, said cavity being separate from said cutting chamber save for at least one opening to direct airflow from said cavity to said cutting chamber and towards the opening of said hood.

Preferably said cutting means includes at least one cutting blade.

Preferably said at least one cutting blade is a metal cutting blade with it said cutting edge presented perpendicular to the axis of rotation.

Preferably said means to cut includes at least one metal cutting blade with it said cutting edge presented perpendicular to the axis of rotation and parallel to the plane of said opening, said cutting edge placed on the cutting chamber side of said opening.

Preferably said cutting means includes at least one flexible cutting wire extending from said rotary shaft.

Preferably said cutting means is positioned immediately adjacent the opening to said hood on the cutting chamber side of said opening.

Preferably said hood is extensive over said cutting means from all directions save from said opening presented direction.

In a second aspect the present invention consists in a lawn trimmer tool comprising;

a motor a rotary trimmer unit which derives rotational power from said motor via an elongate shaft attached to be rotationally driven by said motor, said elongate shaft captured substantially within a protective sleeve wherein said rotary trimmer unit comprises, (a) a means to cut coupled to said elongate shaft to be rotationally driven thereby about an axis of rotation, (b) a hood extensive over said means to cut yet exposing said means to cut through a hood opening which in use is to be positioned parallel to and juxtaposed the ground over which the hood is swung by a user, (c) a flexible coupling means disposed at the end of said elongate shaft distal from said motor and engaged to said hood and said protective sleeve, said flexible couple means providing a flexible coupling between said hood and said protective sleeve allowing said hood to swivel in use about axes of rotation substantially parallel to the ground over which said hood is swung by a user, a support handle disposed from the protective sleeve intermediate of said motor and said rotary trimmer unit.

Preferably said hood is mounted secured to, yet flexibly disposed from, said protective sleeve to be supported thereby to allow said hood to swivel.

Preferably said at least one axis includes a second axis transverse to said first mentioned axis and parallel to said ground.

Preferably said flexible coupling is a flexible tendon providing infinite said axes of rotation of said hood parallel to said ground.

Preferably said means to couple is a flexible tendon providing a freedom of movement of said hood about any parallel to the ground axis of rotation.

Preferably said flexible coupling is a flexible tendon through which a flexible shaft for transmission of rotation from said elongate shaft to said means to cut is provided.

Preferably said flexible coupling is a flexible tendon through which said elongate shaft is provided for transmission of rotation is provided, said elongate shaft being flexible in at least that region extending through said flexible tendon.

Preferably said means to couple is a flexible sleeve.

Preferably a fan is disposed within said hood to rotate with said means to cut and to generate a draft of air to encourage the hovering of said hood, in use, above the ground.

Preferably said fan is coaxial with said axis of rotation.

In a further aspect the present invention consists in a lawn trimmer comprising;

a motor a rotary trimmer unit which derives rotational power from said motor via an elongate shaft attached at one end to said motor and at the other end to said rotary trimmer, said elongate shaft captured substantially within a protective sleeve wherein said rotary trimmer unit comprises, a means to cut to derive rotation from said motor via said elongate shaft, a hood extensive over said means to cut to define a cutting cavity therein, yet exposing said means to cut through a hood opening which in use is to be positioned parallel to and juxtaposed the ground over which the hood is swung by a user a fan disposed within said hood defined cutting cavity and juxtaposed to said means to cut intermediate of said hood and said means to cut, said fan rotatable by said motor to in use generate a draft to encourage the hovering of said hood above the ground, a support handle disposed from the protective sleeve intermediate of said motor and said rotary trimmer unit.

Preferably said fan is co-rotational with said cutting means.

Preferably said fan is coaxial with said cutting means.

Preferably said fan includes a disk shaped region from which and towards one side thereof there is disposed a plurality of radially extending blades.

Preferably said cutting means and said fan are mounted from a stub axle mounted from said hood in a manner rotational about a rotational axis in use normal to the surface of said ground over which said hood is moved.

In still a further aspect the present invention consists in a lawn trimming device attachable or attached to the power take off end of a line trimmer primary unit of a kind having a motor positioned at one end of an elongate drive shaft and a protective sleeve about said elongate drive shaft at which said primary unit can be held, in use, by a user, said device to be powered by said line trimmer primary unit, said device including a hood with a downwardly facing opening to allow the opening to be placed parallel to the ground, said hood defining a cutting cavity, a coupling allowing said hood to couple to said line trimmer primary unit a shaft a cutting means rotatably mounted relative to said hood from said shaft, said shaft engaged or engageable to the line trimmer primary unit to derive rotational power from said line trimmer primary unit, said cutting means positioned within said cutting cavity of said hood adjacent said opening wherein said hood provides protective cover to said cutting means save for its exposure at least to said opening, wherein in use said cutting means can engage with grass exposed to said cutting means below said hood, and wherein said hood is pivotally mounted to said line trimmer primary unit.

Preferably said opening is provided in a location directed away from said primary unit such that in use said primary unit extends upwardly away from said hood.

Preferably a fan is mounted within said cutting cavity and is rotatable relative to said hood and derives rotational power from said line trimmer primary unit to generate a draft within said cutting cavity to encourage the hovering of said fan, in use, above said ground.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

FIG. 1 is a sectional view through a lawn trimmer attachment unit of the present invention, FIG. 2 is a sectional view through an attachment wherein an alternative coupling arrangement is provided, FIG. 3 is a sectional view through an attachment wherein an alternative coupling arrangement is provided, FIG. 4 is a sectional view through an attachment wherein an alternative coupling arrangement is provided, FIG. 5 is a sectional view through a fixed lawn mowing unit attached to a line trimmer primary unit, FIG. 6 illustrates an alternative coupling arrangement to the coupling of FIG. 5, FIG. 7 illustrates an alternative coupling arrangement to the coupling of FIG. 5, FIG. 8 illustrates an alternative arrangement to the coupling arrangement of FIG. 5.

FIG. 10 is a sectional view through an attachment wherein an alternative arrangement of the hood is provided, FIG. 11 is a sectional view through a lawn trimmer attachment unit of another embodiment of the present invention, FIG. 12 is a sectional view through a lawn trimmer attachment unit of another embodiment of the present invention, and FIG. 13 is a perspective view of the end of the shaft of the lawn trimmer attachment unit.

DETAILED DESCRIPTION OF THE INVENTION

Figure 1A:
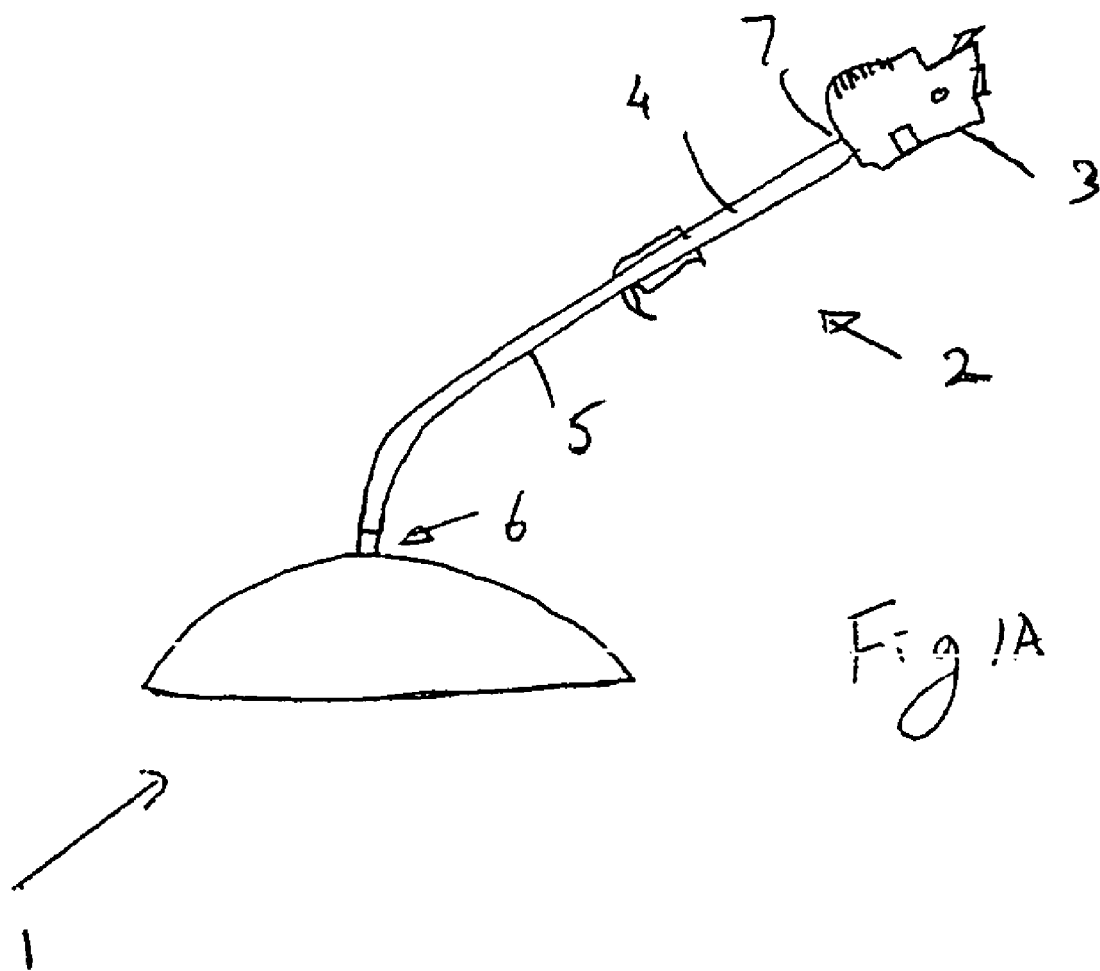
FIG. 1a is a side view of a line trimmer with a lawn trimmer attachment unit engaged thereto.

With reference to FIG. 1A there is shown a lawn trimmer attachment unit 1 which is engaged to a line trimmer primary unit 2. The line trimmer primary unit 2 for example consists of a motor 3 which may be an electric motor. Alternatively the motor 3 may be an internal combustion engine such as a two or four stroke petrol engine. The motor 3 is engaged to an elongate drive shaft 4 which is driven by the motor 3. The elongate drive shaft 4 is preferably enclosed within a protective sleeve 5 and engaged or coupled at one end 7 to the motor 3. At the second distal end 6 opposite to the distal end 7 where the elongate drive shaft 4 is engaged to the motor, there is provided the lawn trimmer attachment unit 1. In some forms of the present invention the lawn trimmer attachment unit 1 may be permanently attached to the line trimmer primary unit 2. Alternatively the lawn trimmer attachment unit 1 may be removeably engaged to the line trimmer primary unit 2. With reference to FIGS. 1–4, a removeably attached version is shown. With reference to FIGS. 5–8, a permanent although mechanically removable attachment version is shown.

With reference to FIG. 1, the lawn trimmer attachment unit 1 is engaged to the line trimmer primary unit 2 at region 10.

The lawn trimmer attachment unit 1 includes a hood 11 which provides an enclosure 12 within which a trimmer assembly 13 is mounted. The enclosure 12 (or cutting cavity) includes an opening 14 bounded by the perimeter 15 of the hood. The perimeter 15 defines an opening plane which is substantially parallel to the ground over which the lawn trimmer attachment unit 1 is swung when in use.

The trimming assembly 13 includes a rotary shaft 16 (or stub axle) which is rotationally dependent from the hood 11. The rotary shaft 16 is rotatable about an axis 17 which is substantially normal to the plane of the opening 14 defined by the hood. Bearings mount the rotary shaft 16 from the hood.

The line trimmer attachment unit 1 is engageable to the line trimmer primary unit by way of a coupling 18 attached or attachable to the protective sleeve 5. The rotary shaft 16 is then also coupled to the elongate drive shaft 4 of the line trimmer primary unit 1.

The hood may for example be made from a sheet metal material or from a moulded plastics material. The hood provides protection to the trimming assembly 13 and to persons standing thereabout and only exposes the trimming assembly via the opening 14. The trimming assembly 13 includes blades 19 which are the blades which rotate with the rotary shaft 16 about the axis 17 and subject the grass which enters into the enclosure 12 via the opening 14 to a cutting action. The blades in the examples shown are preferably of a fixed and solid blade such as for example ones made from a sheet metal material. However alternatively the blades may be defined by nylon or other synthetic wire strings. The strings will be attached to a hub mounted centrally about the rotary shaft 16 and from which the nylon will radially extend.

In one preferred embodiment of the present invention the hood 11 also has captured within its enclosure 12 a fan 20.

The fan 20 is also mounted from the rotary shaft 16 and rotatable about its axis of rotation 17. The fan 20 will include a plurality of fan blades 21 which are provided to create a downdraft within the enclosure directing air flow in a downward direction. Airflow within the enclosure 12, forced in a downward direction, will result in a hovering effect provided by the unit 1 as it passes over the ground. The downdraft will create an elevating effect to the hood 11 thereby ensuring that the hood can be kept above the ground with minimal support from the strength of a user holding the line trimmer 2. The air will squeeze out between the perimeter 15 of the hood 11 and the ground. The perimeter 15 of the hood 11 providing a substantially planar opening 14 will allow for the cutting elements 19 to be maintained at a height no less than the height X between the perimeter and the distance that the cutting elements 19 are positioned within the enclosure 12 from the perimeter 15 of the hood 11. Accordingly there is a minimum height that is provided as cutting of the grass occurs by the lawn trimmer attachment unit 1 of the present invention. Accordingly the perimeter 15 of the hood 11 provides a height gauge between the ground and the blades 19 in order to prevent the blades from gauging the grass. The hood 11 is preferably in plan view of a circular perimeter shape.

In the preferred form, the fan 20, which is mounted from the rotary shaft 16, is driven by the motor 3. In an alternative form, the fan 20 may be driven by a second motor, independent from the motor 3.

Figure 9:
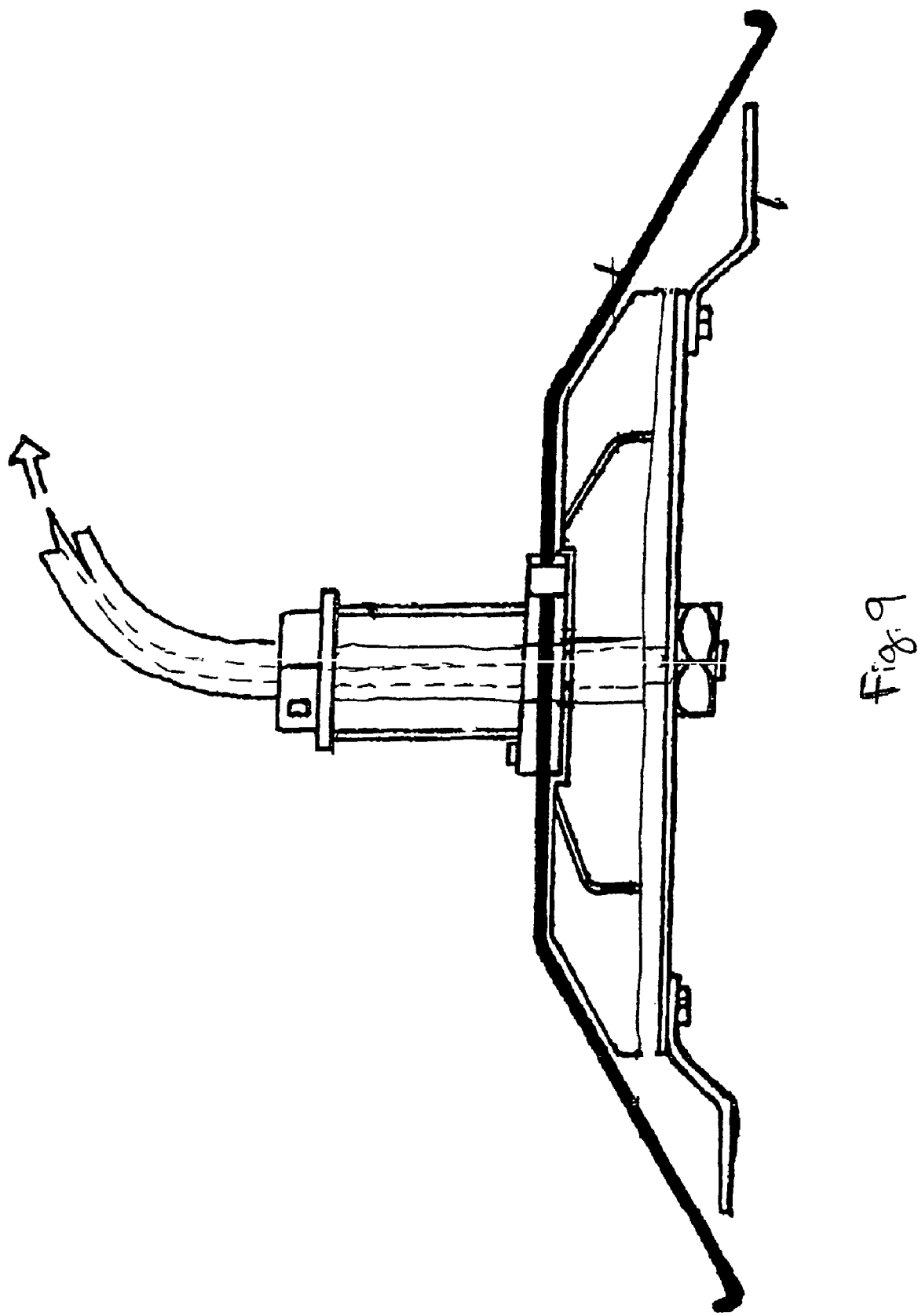
FIG. 9 illustrates an alternative arrangement of the fan and the means to cut.

Further, in the preferred form, the fan 20 and the blades 19 are of a single unit as depicted in FIG. 1. In an alternative form as depicts in FIG. 9, the fan 20 and the blades 19 can be of two separate units, both mounted from said rotary shaft 16. It is appreciated that both the fan 20 and the blade 19 may be driven by the same motor 3 or be driven by two separate motors thereby allowing different rotational speeds to be achieved.

In another embodiment when the fan 20 and the blades 19 are of two separate units or part of the same unit, a second hood may be provided intermediate the fan and the blades such that the fan is disposed intermediate the first and the second hoods as shown in FIG. 10. Outlets 61 to the cavity 60 are provided to direct the flow of air.

The primary trimmer unit 2 extends from an upper surface (surface opposite to the opening) of the hood 11 upwardly in a direction to allow a person to hold the units 2 and sweep the hood 11 over the ground.

A quick attachment mechanism 23 is preferably provided to allow for the lawn trimmer attachment unit 1 as per FIGS. 1–4 to be released and quickly attachable to a line trimmer primary unit 2. Such attachment will preferably occur by the engagement of the lawn trimming unit 1 to the distal end 6 of the enlongate drive shaft 4 and protective sleeve 5 of the primary unit 2. The quick attachment in FIG. 1 is shown in two positions a first position 23a wherein the unit is engaged and 23b wherein the quick release allows for the unit 1 to become detached from the primary unit 2.

In an alternative or additional preferred form the hood 11 and the trimming assembly 13 are preferably mounted from the line trimmer primary unit in a flexible manner. Such a flexible disposition of the hood 11 and trimmer unit 13 from the line trimmer primary unit 2 will allow for the hood 11 to follow any uneven contours in the ground or to allow for the adaption of the hood 11 relative to the primary unit 2 in a manner to ensure that the hood 11 is maintained in a disposition relative to the ground so that the perimeter 15 remains parallel therewith. The coupling 18 is accordingly of a flexible coupling type 27 such as for example shown in FIGS. 1–8 save for FIG. 1A. The flexible coupling 27 will allow for a pivoting of the hood 11 relative to the elongate drive shaft 4 of the primary unit to allow for desired pivotal rotation of the hood 11 to occur relative to the elongate drive shaft 4. Such rotation is preferably about axes which are substantially horizontal. This mounting will allow for the power from the motor 3 to still be delivered to the cutting unit 13 to rotate the cutting unit 13 about its axis 17. The rotary drive shaft 16 is likewise flexible and may be of a mechanical type and examples include the constant velocity joint 26 as shown in FIG. 1 or the universal joint 26 as shown in FIGS. 3, 6, 7. The hood 11 is prevented from rotating about the axis 17 by the flexible coupling 27 yet is provided to allow for the pivoting of the hood 11 relative to the protective sleeve 5 of the primary unit 2. A flexible coupling 27 may for example be of rubber or plastics which can deflect. Such is for example shown in FIGS. 1, 5 and 6. Alternatively a ball and socket coupling 27 as for example shown in FIGS. 2, 4, 7 and 8 may be used for such purposes. The flexible coupling 27 will allow for the hood and trimming-assembly to gimble relative to the primary unit 2. The movement that may be allowed by such flexible connection may be over a radius of 45 degrees (or preferably 20 degrees) either side of the vertical and about a horizontal pivot. Many types of kinematic like flexible couplings 27 can be used.

The present invention herein described allows for rotation of said rotary drive shaft 16 with a single speed. In another embodiment of the present invention as depicted in FIG. 11, the lawn mower attachment 1 is provided with a gear box for varying the rotational speed of said rotary shaft 16. It is appreciated by a person skilled in the art that gears of various kind, such as gears with the use of belts, chains or pulleys may be employed for the said purpose.

The use of gears (or belt's/chain's/pulley's) to give lateral or vertical differential in any plane, e.g. by the use of bevelled gears.

With reference to FIG. 12 there is shown a lawn trimmer attachment unit 1 which has a protective sleeve 53 extending from the motor (not shown) and within which an elongate drive shaft 50 to allow for the trimming assembly to derive rotational power from the motor disposed therein. The elongate drive shaft 50 may in part or in its entirety be of a flexible nature such that its axis of rotation may not be constant over its entire length. As can be seen with reference to FIG. 12, the elongate drive shaft 50 curves towards the distal end of the protective sleeve 53 for its presentation to be substantially vertical at the distal end of the elongate drive shaft 50. Whilst the protective sleeve 53 terminates at region 52 the distal end 54 of the elongate drive shaft 50 extends beyond the distal end 52 of the protective sleeve 53. Indeed the portion of the elongate drive shaft 50 extending beyond the distal end of the protective sleeve 53 becomes located within a flexible tendon or flexible tendon 55 which forms the coupling between the lawn trimmer attachment unit 1 and the protective sleeve 53 of the primary line trimming unit 2. The flexible tendon 55 is preferably of a rubber hose or sleeve or similar cylindrical configuration and is flexible such that its end engaged to the distal end 52 of the protective sleeve 53 and the end 56 engaged to a portion of the hood 11 can establish non-parallel axial dispositions. The flexible tendon 55 preferably remains attached with the lawn trimmer attachment unit 1.

As a consequence of such flexibility providing the flexible tendon 55 the hood 11 can move relative to the distal end 52 of the protective sleeve 53 and thereby allow the hood 11 to pivot relative to the protective sleeve 53 about any number of axes which may be generally described as horizontal axes (i.e. axes substantially normal to the axis of rotation of the trimming assembly). With reference to FIG. 12, the lawn trimmer attachment unit 1 includes a hub 66 or bearing house 66 within which bearings 77 are disposed for the holding of the rotary shaft or stub axle 16 in a fixed location relative to the hood 11. The hub 66 has engaged therewith at its end 56, the flexible tendon 55 in a rotationally fixed condition at least at its distal end 56. The other end 59 of the flexible tendon 55 is fixed or fixable to the end 52 of the protective sleeve 53. As a consequence of such fixing, minimal or no relative rotation occurs between the hood 11 and the protective sleeve 53 other than about the horizontal axes the rotation about which is provided for by the flexible tendon 55. The flexible tendon 55 is hence sufficiently rigid in a torsional sense to prevent the rotation of the hood 11 and its hub 66 about the axis of rotation of the trimming assembly during use.

The hood 11 may include air inlet ports 92 which allows for air to be drawn into the cutting cavity of the hood 11. A dust cover or bellow like arrangement 46 may be provided to extend to at least enclose the flexible tendon 55 and also the hub 66. In the configuration as for example shown in FIG. 12 the line trimming attachment unit 1 is of a kind permanently attached with the primary line trimming unit 2. However this configuration may be conveniently adopted by the provision of a fastening ring or clamp about the first distal end 59 of the flexible tendon 55 to allow it to clamp with the distal end 52 of the protective sleeve 53. Such a clamp, akin to a hose clamp but operational in a manual manner preferably without tooling by a user, can extend about the flexible tendon 55 at its end 59 to clamp with the distal end 52 of the protective sleeve 53. The prior insertion of the distal end 52 within the end opening of the flexible tendon 55 and by engaging the end 54 of the elongate drive shaft 50 with the rotary shaft 16 can allow for a retrofittable and also removable assembly of the lawn trimmer attachment unit 1 with a primary line trimming unit 2 to be defined. Provided at the distal end 54 of the elongate drive shaft 50 may be a keyed end section which can insert into a complimentary shaped key receiving region 68 of the end of the rotary shaft 16 as shown in FIG. 13. A square drive key or spline like key configuration may be provided for such purposes. In this manner torque can be transmitted from the elongate drive shaft 50 to the fan 20 and cutter 19. The square drive can be inserted into a square receiving region to allow for torque to be transmitted when in the assembled configuration. The end of the rotary shaft 16 is for example shown in FIG. 13 and illustrates the key receiving region 68 within which a square drive key of the end of the flexible shaft 50 can engage. Such a sliding engagement can allow for a simple retrofittable connection to be established.

With reference to FIG. 1a it can be seen that in the preferred form the elongate drive shaft of the prime mover is positioned to, in use be held by a user at an inclined angle to the vertical. This allows a user to grasp the protective sleeve 5 and hold the device in a condition to allow it to be swung over the ground. Alternatively the user may grasp handles which are disposed from the protective sleeve 5 in order to support the device for use. With the combination of the fan and the swivelling hood, the device becomes convenient to be used in that the weight of the device is in part supported by the hovering action generated by the fan and need not be moved in a manner to keep the shaft in the same condition relative to the surface over which the hood is moved as a result of the flexibility in the coupling to allow the hood to contour over uneven or sloping or even flat ground as the device is traversed thereover. The shaft of the prime mover is preferably of a length where the handle or handhold of the device is intermediate of the motor and the cutting end. The motor in use normally swings being the person holding the device.

The invention claimed is:

1. A lawn trimmer component for attachment to a hand held prime mover which includes a motor with which an elongate drive shaft is connected to be rotationally driven by said motor, said elongate drive shaft captured substantially within a protective sleeve rigidly connected to said motor, said elongate drive shaft presented at an end of said protective sleeve away from said motor for coupling to said lawn trimmer component, said lawn trimmer component comprising:
   (a) a rotary shaft to derive rotational power via said elongate drive shaft from said motor for rotating said rotary shaft about an axis of rotation
   (b) a cutting means engaged to and radially disposed from said rotary shaft to rotate about said axis of rotation,
   (c) a hood defining a cutting chamber extensive over said cutting means yet exposing said cutting means to an opening of said hood which, in use, is to be positioned juxtaposed the ground over which said lawn trimmer component is, by control of said prime mover, moved by a user, wherein said hood is mounted stationary to said rotary shaft except for the relative rotation of said rotary shaft with said hood about said axis of rotation,
   (d) a flexible coupling device engaged to said hood and engagable with said end of said protective sleeve, said flexible coupling device to mount said hood from said protective sleeve in a manner to allow the hood to swivel relative to said protective sleeve.

2. A lawn trimmer component as claimed in claim 1 wherein said opening of said hood is a planar opening.

3. A lawn trimmer component as claimed in claim 1 wherein said cutting means extends from said rotary shaft to present a cutting edge thereof substantially parallel to the plane of said opening.

4. A lawn trimmer component as claimed in claim 1 wherein said rotary shaft is engaged to and to be supported from said hood by a cylindrical bearing.

5. A lawn trimmer component as claimed in claim 1 wherein said rotary shaft includes a cutting means mount with which said cutting means is affixed and a stub axle extending therefrom coaxial with said axis of rotation, said stub axle supporting said hood in a fixed relationship thereto save for relative rotation about said axis rotation.

6. A lawn trimmer component as claimed in claim 1 wherein said flexible coupling device has said rotary shaft located therethrough, said rotary shaft is a flexible rotary shaft presenting an input end to engage with said elongate drive shaft and an output end to engage with said cutting means, said input end capable of axial misalignment with said axis of rotation of said cutting means to allow said hood to swivel relative to said input end yet still allow in use a continuous power to be provided by said motor via said elongate drive shaft.

7. A lawn trimmer component as claimed in claim 1 wherein said flexible coupling device is hollow and said rotary shaft is captured therein.

8. A lawn trimmer component as claimed in claim 1 wherein said flexible coupling device is a ball and socket connection.

9. A lawn trimmer component as claimed in claim 1 wherein said flexible coupling device is a bendable sleeve through which said rotary shaft extends.

10. A lawn trimmer component as claimed in claim 1 wherein a fan is mounted from said rotary shaft for rotation relative to said hood and about said axis of rotation and within the perimeter of said hood in a manner to generate an airflow which in use is in a direction outward from the opening of said hood.

11. A lawn trimmer component as claimed in claim 10 wherein said cutting means is provided intermediate of said opening and said fan.

12. A lawn trimmer component as claimed in claim 10 wherein said fan is a centrifugal fan and the airflow generated by its rotation is displaced in a generally radial direction and in consequence of said hood substantially enclosing said airflow generated traveling away from said opening, said airflow is expelled from said hood in a direction outward from said cutting chamber via said opening.

13. A lawn trimmer component as claimed in claim 10 wherein said fan is an axial fan and the air flow generated by its rotation is displaced in a generally axial direction to be expelled from said hood in a direction outward via said opening.

14. A lawn trimmer component as claimed in claim 1 wherein said hood includes a cavity within which a fan is mounted dependent from said rotary shaft for rotation about said axis of rotation, said cavity being separate from said cutting chamber save for at least one opening to direct airflow from said cavity to said cutting chamber and towards the opening of said hood.

15. A lawn trimmer tool comprising:
a motor
a rotary trimmer unit which derives rotational power from said motor via an elongate shaft attached to be rotationally driven by said motor, said elongate shaft captured substantially within a protective sleeve,
wherein said rotary trimmer unit comprises,
(a) a means to cut coupled to said elongate shaft to be rotationally driven thereby about an axis of rotation,
b) a hood extensive over said means to cut yet exposing said means to cut through a hood opening which in use is to be positioned parallel to and juxtaposed the ground over which the hood is swung by a user,
c) a flexible coupling means disposed at the end of said elongate shaft distal from said motor and engaged with said hood and said protective sleeve, said flexible coupling means providing a flexible coupling between said hood and said protective sleeve allowing said hood to swivel in use about axes of rotation substantially parallel to the ground over which said hood is swung by a user,
a support handle disposed from the protective sleeve intermediate of said motor and said rotary trimmer unit.

16. A lawn trimmer tool as claimed in claim 15 wherein said hood is mounted secured to, yet flexibly disposed from, said protective sleeve to be supported thereby to allow said hood to swivel.

17. A lawn trimmer tool as claimed in claim 15 wherein said flexible coupling means is a flexible tendon providing infinite said axes of rotation of said hood parallel to said ground.

18. A lawn trimmer tool as claimed in claim 15 wherein said flexible coupling means is a flexible tendon through which a flexible shaft for transmission of rotation from said elongate shaft to said means to cut is provided.

19. A lawn trimmer tool as claimed in claim 15 wherein said flexible coupling means is a flexible tendon and through which said elongate shaft is provided for transmission of rotation, said elongate shaft being flexible in at least that region extending through said flexible tendon.

20. A lawn trimmer tool as claimed in claim 15 wherein a fan is disposed within said hood to rotate with said means to cut and to generate a draft of air to encourage the hovering of said hood, in use, above the ground.

21. A lawn trimmer tool as claimed in claim 20 wherein said fan is coaxial with said axis of rotation.

22. A lawn trimmer comprising;
a motor,
a rotary trimmer unit which derives rotational power from said motor via an elongate shaft attached at one end to said motor and at the other end to said rotary trimmer, said elongate shaft captured substantially within a protective sleeve,
wherein said rotary trimmer unit comprises,
(a) a means to cut to derive rotation from said motor via said elongate shaft,
(b) a hood extensive over said means to cut to define a cutting cavity therein, yet exposing said means to cut through a hood opening which in use is to be positioned parallel to and juxtaposed the ground over which the hood is swung by a user,
(c) a fan disposed within said hood defined cutting cavity and juxtaposed to said means to cut intermediate of said hood and said means to cut, said fan rotatable by said motor to in use generate a draft to encourage the hovering of said hood above the ground,
a support handle disposed from the protective sleeve intermediate of said motor and said rotary trimmer unit.

* * * * *